United States Patent [19]

Yushiya et al.

[11] Patent Number: 5,280,358

[45] Date of Patent: Jan. 18, 1994

[54] PHOTOELECTRIC CONVERTING APPARATUS HAVING AN ANALOG MEMORY

[75] Inventors: Akihiko Yushiya, Atsugi; Mahito Shinohara, Tokyo, both of Japan

[73] Assignee: Canon Kabushiki Kaisha, Tokyo, Japan

[21] Appl. No.: 538,015

[22] Filed: Jun. 13, 1990

[30] Foreign Application Priority Data

Jun. 14, 1989 [JP] Japan .................. 1-149723

[51] Int. Cl.$^5$ ............................................. H04N 5/335
[52] U.S. Cl. ............................ 358/213.17; 358/213.11
[58] Field of Search ................... 358/213.17, 213.15, 358/213.11, 213.18, 167, 43, 44, 148; 365/45

[56] References Cited

U.S. PATENT DOCUMENTS

| | | | |
|---|---|---|---|
| 4,479,143 | 10/1984 | Watanabe et al. | 358/44 |
| 4,523,231 | 6/1985 | Therrien | 358/213.17 |
| 4,524,390 | 6/1985 | Lemke | 358/213.17 |
| 4,661,860 | 4/1987 | Miyazawa | 358/213.15 |
| 4,709,350 | 11/1987 | Nakagome et al. | 365/45 |
| 4,734,589 | 3/1988 | Atherton | 358/213.11 |
| 4,783,842 | 11/1988 | Fuwa | 358/213.15 |
| 4,896,207 | 1/1990 | Parulski | 358/44 |
| 4,896,216 | 1/1990 | Brunst et al. | 358/213.11 |
| 4,902,886 | 2/1990 | Smisko | 358/213.15 |
| 4,985,758 | 1/1991 | Hashimoto | 358/44 |
| 5,023,443 | 6/1991 | Komatsu et al. | 358/213.18 |
| 5,043,719 | 8/1991 | Nakagawa et al. | 358/213.11 |

*Primary Examiner*—James J. Groody
*Assistant Examiner*—Jeffrey S. Murrell
*Attorney, Agent, or Firm*—Fitzpatrick, Cella, Harper & Scinto

[57] ABSTRACT

A photoelectric converting apparatus comprises a photoelectric conversion unit for outputting a photoelectrically converted signals. An analog memory is provided comprising switches and capacitors. The analog memory can be accessed at random and stores a first photoelectrically converted signal outputted from the photoelectric conversion unit. A controller outputs the first signal from the analog memory in correspondence to a second photoelectrically converted signal which is outputted from the photoelectric conversion unit.

16 Claims, 6 Drawing Sheets

| 41 | 42 | 43 | | 4N-1 | 4N |
|----|----|----|--|------|----|
| 51 | 52 | 53 | | 5N-1 | 5N |
|    |    |    |  |      |    |

PHOTOELECTRIC CONVERTING APPARATUS HAVING AN ANALOG MEMORY

BACKGROUND OF THE INVENTION

1. Field of the Invention

The present invention relates to a photoelectric converting apparatus and, more particularly, to a photoelectric converting apparatus in which a first signal output from a photoelectric conversion unit is stored and the first signal is output in correspondence to a second signal which is output from the photoelectric conversion unit.

2. Related Background Art

In recent years, a video camera using a solid-state image pickup device as an image input device has widely been used. It is considered that this is because the solid-state image pickup device has largely contributed to the realization of the small size, light weight, and low costs of the video camera. Although almost all of the video cameras for public use require color images, the solid-state image pickup device of a single plate is a main stream from viewpoints of the realization of small size, light weight, and low costs. In the case of obtaining a color image by using the single plate type solid state image pickup device, in many cases, a chrominance signal is obtained by adhering mosaic color filters to the solid-state image pickup device. In the case of obtaining an image signal by using such color filters, when considering only the signal of one horizontal line, all of the chrominance signals do not always exist. Therefore, color information which does not exist on the horizontal line is obtained from the horizontal line which is one line before.

Figure 1:
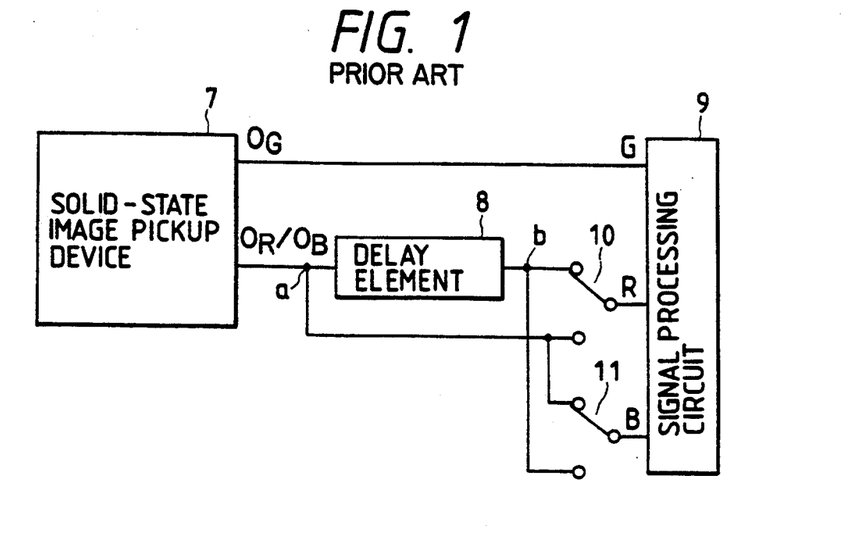
FIG. 1 is a schematic diagram showing an example of a construction of a conventional solid-state image pickup device.

FIG. 1 is a schematic constructional diagram showing an example of a construction of a conventional solid-state image pickup device.

As shown in the diagram, by inputting R/B outputs OR/OB of a solid-state image pickup device 7 to a delay element 8, a signal which is one horizontal period before a branch point a on the inputting side is always output to a branch point b on the outputting side of the delay element 8. Therefore, by switching means 10 and 11, signals of R, G, and B are always obtained.

There is also a configuration where a CCD type is mainly used as a delay element 8 and the delay element 8 is formed together with the solid-state image pickup device 7 onto the same chip.

However, in the above conventional solid-state image pickup device, when a CCD type delay element is used as a delay element, if a sensor unit is constructed by an element other than the CCD type, the manufacturing method becomes complicated, resulting in increase in costs. On the other hand, in the case of the CCD type, since the random access cannot be executed, there is a problem such that outputs of the delay elements cannot help being extracted in accordance with the serial inputting order.

SUMMARY OF THE INVENTION

It is an object of the present invention to provide a photoelectric converting apparatus which is suitably used for the above solid-state image pickup device.

According to a preferred embodiment of the invention, a photoelectric converting apparatus comprises a photoelectric conversion unit, switching means, capacitor means, and an analog memory which can be accessed at random and stores a first signal from the photoelectric conversion unit, wherein the first signal is output from the analog memory in correspondence to a second signal which is output from the photoelectric conversion unit.

Therefore, the switching means and the capacitor means are provided on the outputting side of the photoelectric conversion unit, the analog memory which can be accessed at random is connected to the outputting side of the photoelectric conversion unit, the first signal which is output from the photoelectric conversion unit is stored into the analog memory, and the stored first signal is output from the analog memory at a desired timing (for instance, simultaneously) in correspondence to a second signal which is output from the photoelectric conversion unit.

By using the analog memory, the photoelectric conversion unit and the analog memory can be also formed onto the same semiconductor substrate. For instance, if the photoelectric conversion unit and the analog memory are constructed by MOS type transistors or the like, they can be formed by the same process. Therefore, the apparatus can be easily manufactured and the apparatus in which the photoelectric conversion unit and the analog memory have the same characteristics can be obtained.

DETAILED DESCRIPTION OF THE PREFERRED EMBODIMENTS

An embodiment of the present invention will be described in detail hereinbelow with reference to the drawings.

Figure 2A:
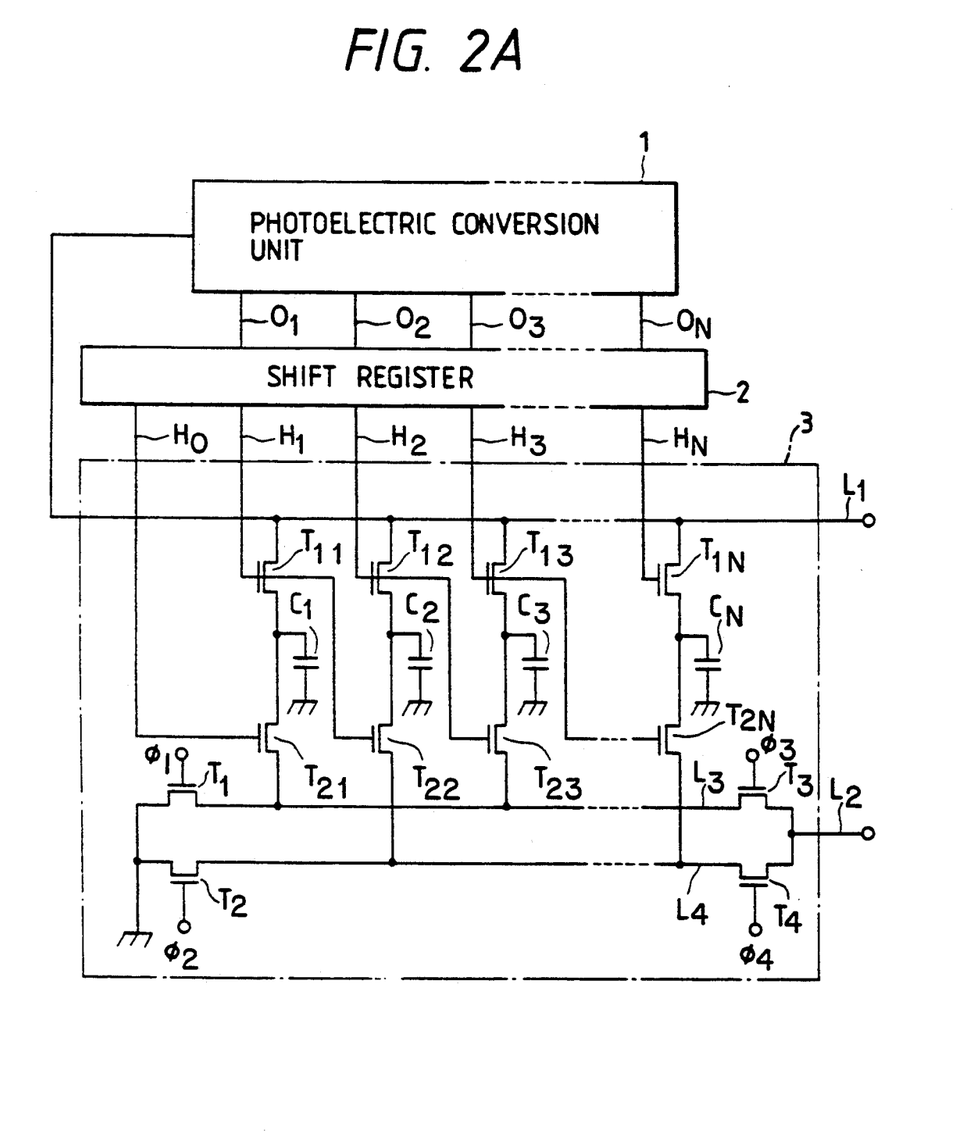
FIG. 2A is a schematic circuit constructional diagram of the first embodiment of a photoelectric converting apparatus according to the invention.

FIG. 2A is a schematic circuit contructional diagram of the first embodiment of a photoelectric converting apparatus of the invention.

In the diagram, reference numeral 1 denotes a photoelectric conversion unit to output an electric signal corresponding to the incident light. The unit 1 includes a plurality of photoelectric convertion elements. Reference numeral 2 indicates a shift register to drive the photoelectric conversion unit 1 and an analog memory 3. $H_O$ to $H_N$ represent output lines of the shift register; Analog memory 3 comprises a switch and a capacitor. A signal output line $L_1$ of the photoelectric conversion unit 1 and a memory output line $L_2$ of the analog memory 3 are also provided.

In the analog memory 3, $C_1$ to $C_N$ denote the accumulation capacitors each for temporarily holding and storing a signal which is output to the signal output line $L_1$. $T_{11}$ to $T_{1N}$ denote switches such as MOS transistor or the like for turning on/off the signal output line $L_1$ and the accumulation capacitors $C_1$ to $C_N$ by output pulses $O_1$ to $O_N$ which are output to the outputted lines $H_1$ to $H_N$ of the shift register 2. $L_3$ and $L_4$ indicate memory output lines to output memory outputs; $T_{21}$ and $T_{2N}$ denote switches such as MOS transistors or the like to turn on/off the accumulation capacitor $C_1$ to $C_N$ and the memory output lines $L_3$ and $L_4$ by the output pulses $MO_0$ to $MO_{N-1}$ which are output from the output lines $H_0$ to $H_{N-1}$ of the shift register 2; $T_3$ and $T_4$ sample and hold MOS transistors to sample and hold the signals on the memory output lines $L_3$ to $L_4$; $\phi_3$ and $\phi_4$ gate pulses to control the turn on/off operations of the sample and hold MOS transistors $T_3$ and $T_4$; $T_1$ and $T_2$ resetting MOS transistors to reset the memory output lines $L_3$ and $L_4$; $\phi_1$ and $\phi_2$ gate pulse to control the on/off operation of the resetting MOS transistors $T_1$ and $T_2$.

The operation of the photoelectric converting apparatus will now be described hereinbelow with reference to FIGS. 2B and 3.

Figure 2B:
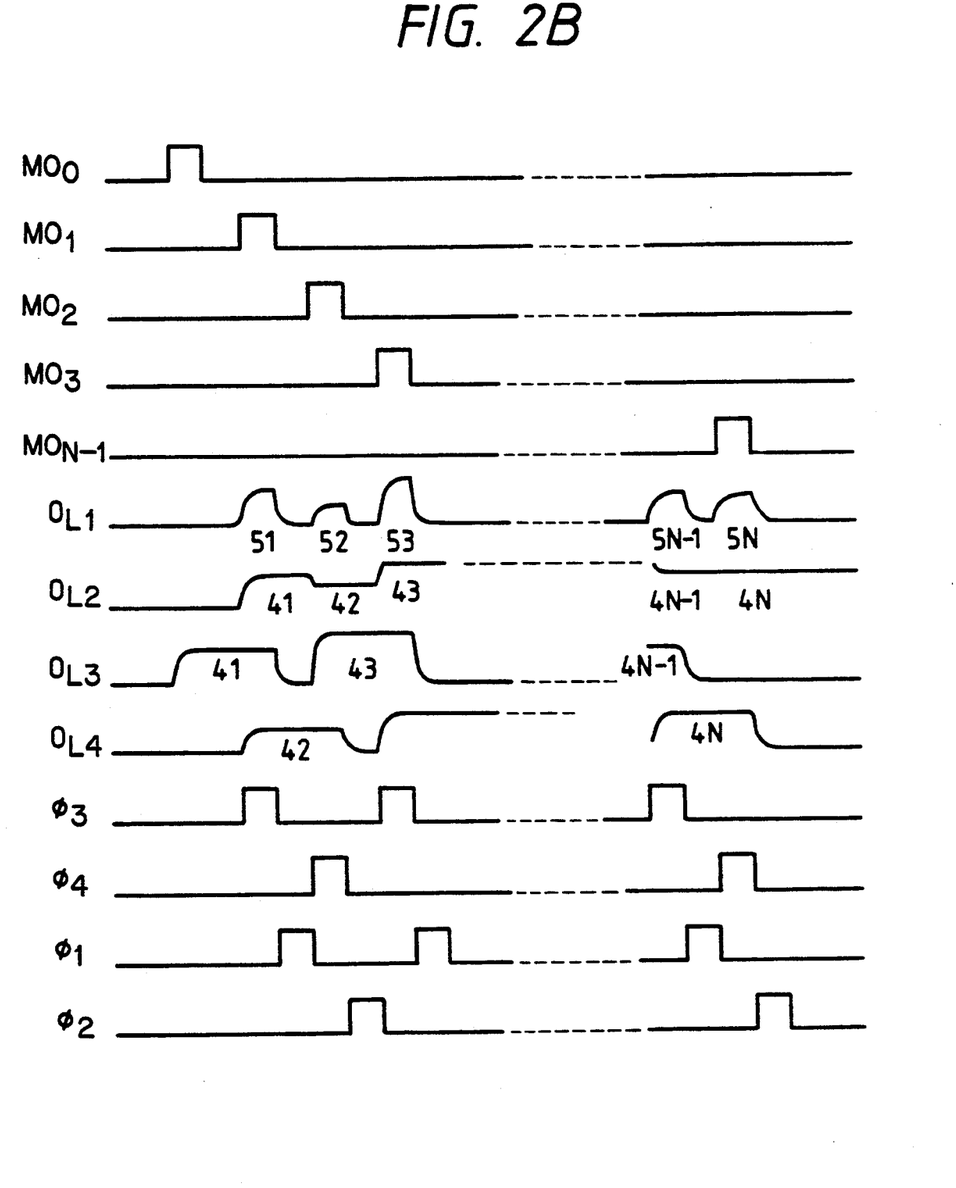
FIG. 2B is a timing chart for explaining the operation of the photoelectric converting apparatus.

FIG. 2B is a timing chart for explaining the operation of the photoelectric converting apparatus.

Figure 3:
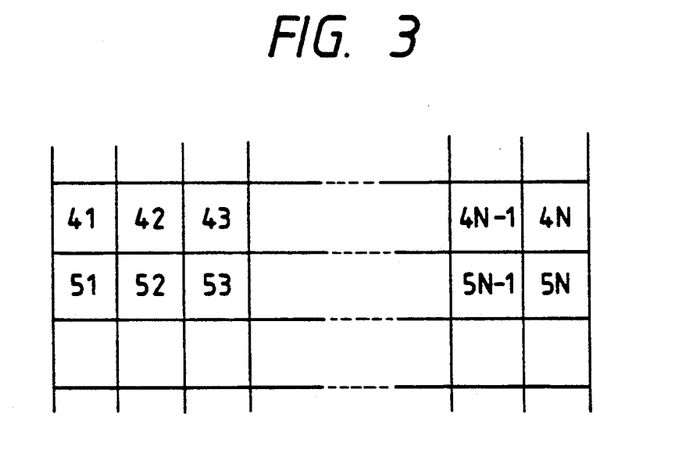
FIG. 3 is an explanatory diagram showing a construction of pixels of the photoelectric conversion unit.

FIG. 3 is an explanatory diagram showing a construction of pixels in the photoelectric conversion unit.

In FIG. 3, reference numerals 41 to 4N and 51 to 5N indicate pixels in one horizontal period.

It is now assumed that after the output signals corresponding to the incident light had been output to the output line $L_1$ from the pixels 41 to 4N in the photoelectric conversion unit 1, they were held and stored into the accumulation capacitors $C_1$ to $C_N$ in the analog memory 3.

When the shift register 2 starts operating and the pulse $MO_0$ is supplied from the output line $H_0$, the switch $T_{21}$ is turned on and a signal $O_{L3}$ corresponding to the pixel 41 accumulated in the capacitor $C_1$ is output to the output line $L_3$. When the pulse $O_1$ is then supplied to the output line $H_1$ and the pulse $\phi_3$ is supplied to the sample and hold MOS transistor $T_3$, a signal $O_{L1}$ of the pixel 51 is output from the photoelectric conversion unit 1 to the output line $L_1$, the switch $T_{11}$ is turned on, and the signal corresponding to the pixel 51 is accumulated into the capacitor $C_1$. On the other hand, since the switch $T_{22}$ is also turned on, a signal $O_{L4}$ corresponding to the pixel 42 accumulated in the capacitor $C_2$ is output to the output line $L_4$. Since the sample and hold MOS transistor $T_3$ is ON, the signal $O_{L3}$ corresponding to the pixel 41 which has been output to the output line $L_3$ is taken out as an output signal $O_{L2}$ from the output line $L_2$.

Transistor $T_3$ and $T_4$ define a selecting means for selecting the outputs $L_3$ or $L_4$ in accordance with signals $\phi_3$ and $\phi_4$, respectively.

Then, when the resetting pulse $\phi_1$ is supplied, the output line $L_3$ is reset. After that, when the pulse $O_2$ is supplied from the shift register 2 to the output line $H_2$ and the sampling and holding pulse $\phi_4$ is supplied, the signal $O_{L1}$ corresponding to the pixel 52 is output from the output signal line $L_1$ and the signal corresponding to the pixel 52 is accumulated into the capacitor $C_2$ through the switch $T_{12}$. At this time, the signal $O_{L3}$ corresponding to the pixel 43 accumulated in the capacitor $C_3$ is output to the output line $L_3$. The signal $O_{L4}$ corresponding to the pixel 42 which has been output to the output line $L_4$ is transmitted through the sample and hold MOS transistor $T_4$ and is output as an output signal $O_{L2}$ to the output line $L_2$. Then, the resetting pulse $\phi_2$ is supplied and the output line $L_4$ is reset. Capacitors $C_1$, $C_3$, ... $C_{n-1}$, which output their signals on $L_3$, define a first group of capacitors, and capacitors $C_2$, $C_4$, ... $C_n$, which output their signals on $L_4$, define a second group of capacitors.

By repeating the operations similar to the above hereinafter, the signals $O_{L1}$ and $O_{L2}$ which are shifted by one horizontal period are simultaneously continuously output from the output lines $L_1$ and $L_2$.

Figure 4:
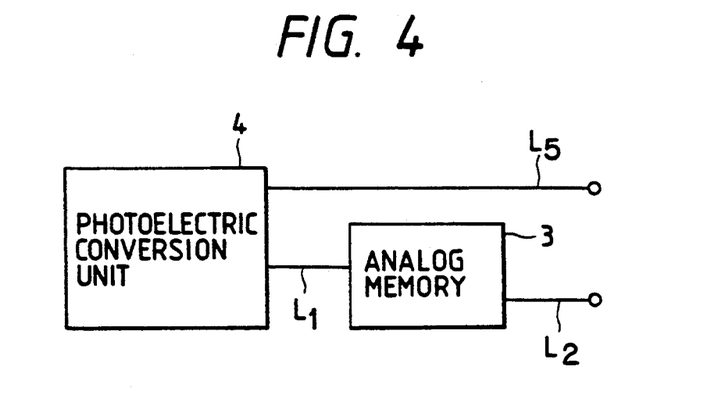
FIG. 4 is a schematic constructional diagram of the second embodiment of a photoelectric converting apparatus of the invention.

FIG. 4 is a schematic constructional diagram of the second embodiment of a photoelectric converting apparatus of the invention.

The same parts and components as those shown in FIG. 2A are designated by the same reference numerals.

Reference numeral 4 indicates a photoelectric conversion unit to output a signal corresponding to the input image and also simultaneously output an output signal in a state in which no incident light is irradiated. $L_5$ indicates an output line to output a dark output. After the photoelectric conversion unit 4 generated an output $S+N$ (including a noise signal N) corresponding to image information S to the output line $L_1$, the unit 4 resets the pixels for one horizontal period and drives so as to output a dark output N. The dark output (noise output) N is delayed by one horizontal period than the image output (signal+noise output) $S+N$.

At this time, therefore, if the analog memory 3 is driven in a manner similar to the first embodiment, the image output (signal+noise output) $S+N$ which was delayed by one horizontal period is output from the memory output line $L_2$. Therefore, by executing a subtraction the dark output N from the image output $S+N$, fixed pattern noises of the photoelectric conversion unit 4 can be eliminated.

Figure 5:
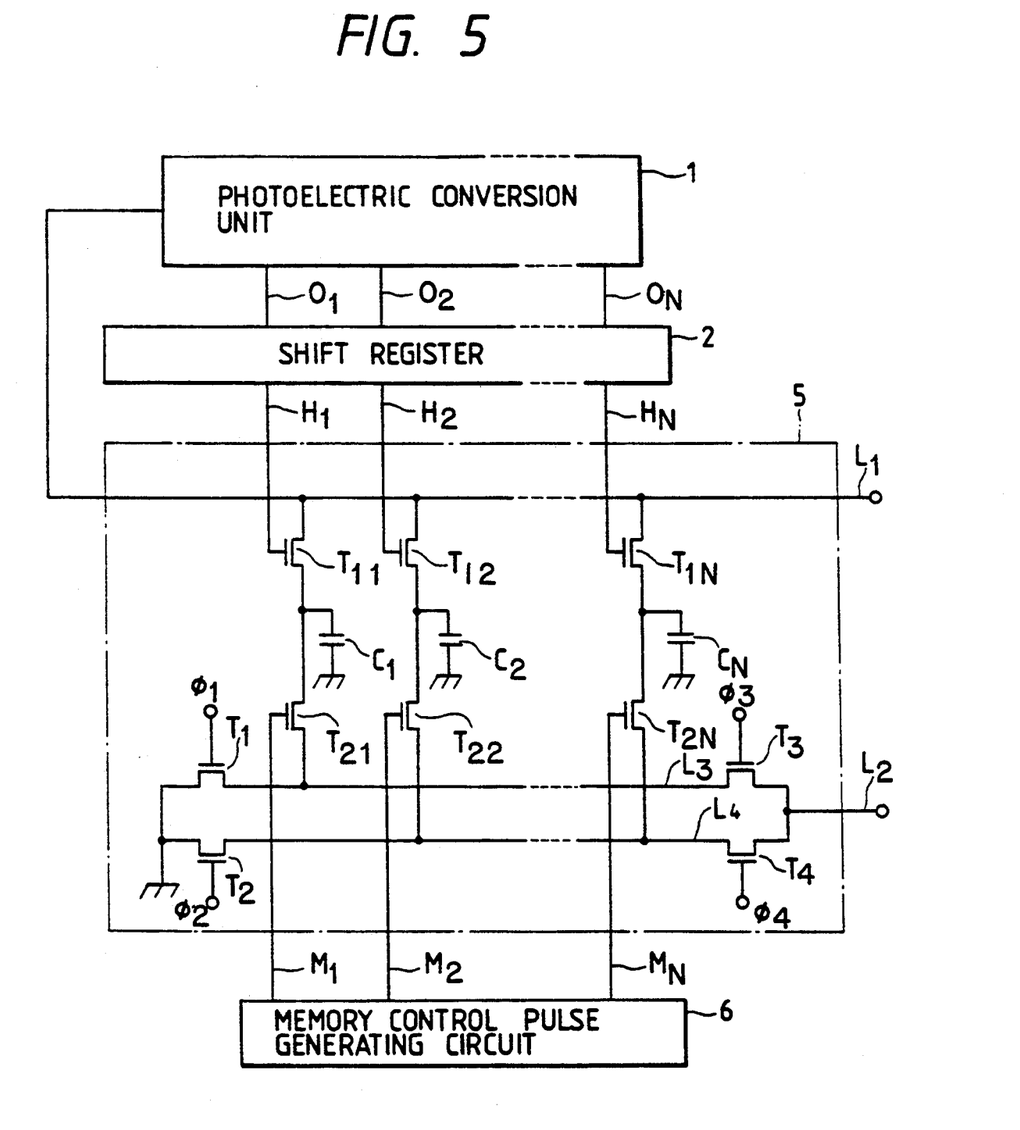
FIG. 5 is a schematic circuit constructional diagram of the third embodiment of a photoelectric converting apparatus of the invention.

FIG. 5 is a schematic circuit constructional diagram of the third embodiment of a photoelectric converting apparatus of the invention.

The same parts and components as those shown in FIG. 2A are designated by the same reference numerals.

In the diagram, reference numeral 5 denotes an analog memory; 6 indicates a memory control pulse generating circuit; and $M_1$ to $M_N$ memory control pulses.

Figure 6:
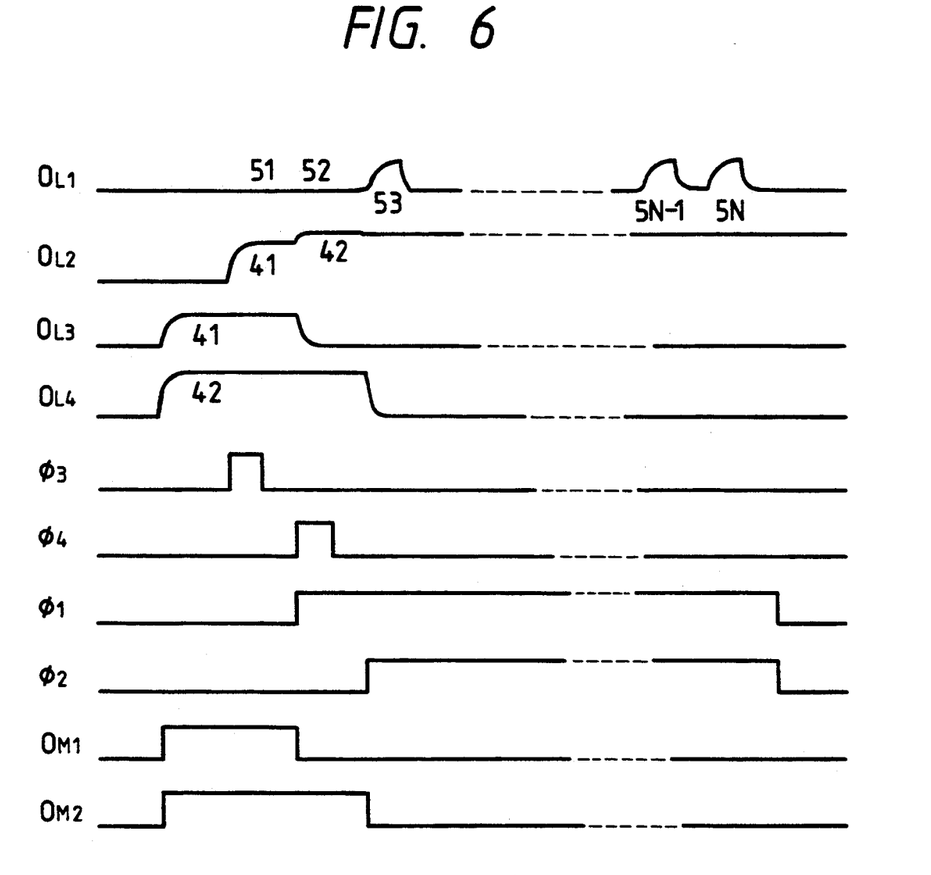
FIG. 6 is a timing chart for explaining the operation of the photoelectric converting apparatus of the third embodiment.

FIG. 6 is a timing chart for explaining the operation of the photoelectric converting apparatus.

It is now assumed that the photoelectric conversion unit 1 output the output signals corresponding to the incident light from the pixels 41 to 4N of one horizontal period to the output line $L_1$ and the signals 41 to 4N are simultaneously accumulated into the capacitors $C_1$ to $C_N$ and, thereafter, the output signals corresponding to the incident light are output from the pixels 51 to 5N of the next line including the defective pixels 51 and 52.

As shown in FIG. 6, before the signals corresponding to the defective pixels 51 and 52 are output from the photoelectric conversion unit 1 to the output line $L_1$, the signals of the pixels 41 and 42 are read out of the accumulation capacitors $C_1$ and $C_2$ to the output lines $L_3$ and $L_4$ by output pulses $O_{M1}$ and $O_{M2}$ from output lines $M_1$ and $M_2$ of the memory control pulse generating circuit 6. When the signal of the pixel 51 is output to the output line $L_1$, by turning on the sample and hold MOS transistor $T_3$, the signal $O_{L3}$ of the pixel 41 is output as an output signal $O_{L2}$ to the output line $L_2$. In a manner similar to the above, when the signal of the pixel 52 is output, the signal $O_{L4}$ of the pixel 42 is also output as an output signal $O_{L2}$ to the output line $L_2$. In this manner, the defective pixel can be corrected at an arbitrary timing.

Figure 7:
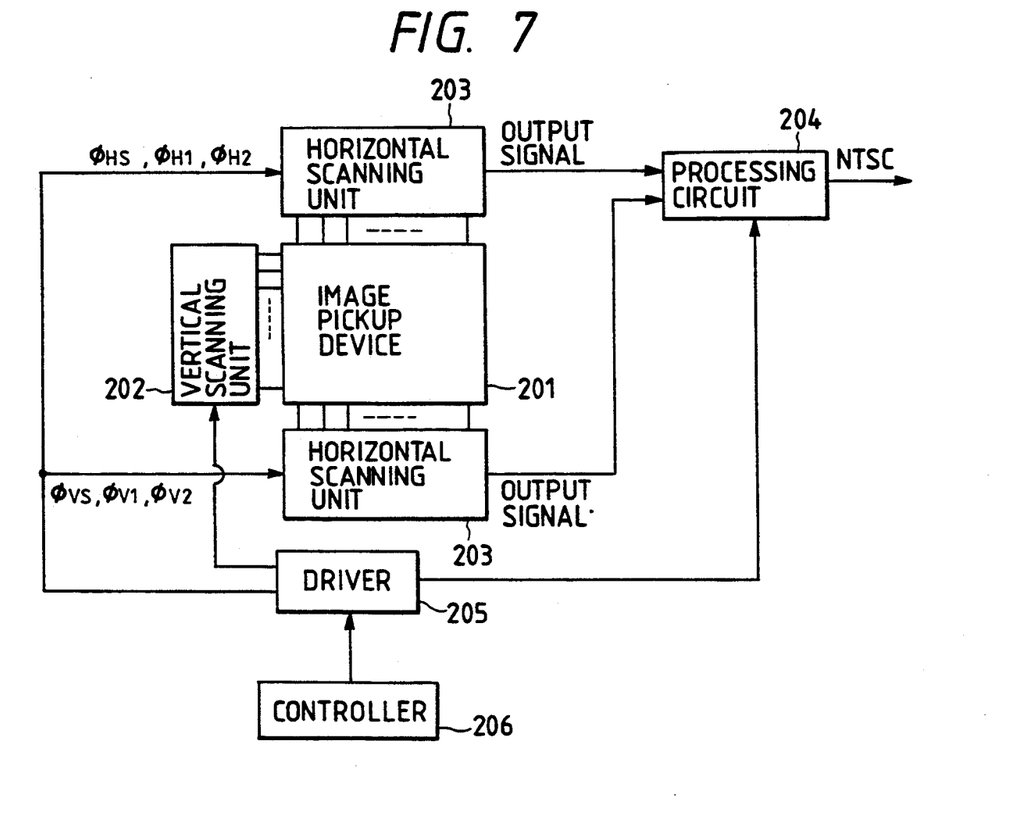
FIG. 7 is a schematic constructional diagram of a solid-state image pickup device to which the invention is applied.

FIG. 7 is a schematic diagram of a solid-state image pickup apparatus to which the invention is applied.

In the diagram, an image pickup device 201 in which photo sensors are arranged like an area executes a television scan by a vertical scanning unit 202 and a horizontal scanning unit 203.

A signal generated from the horizontal scanning unit 203 is output as a standard television signal through a processing circuit 204.

Driving pulses $\phi_{HS}$, $\phi_{H1}$, $\phi_{H2}$, $\phi_{VS}$, $\phi_{V1}$, $\phi_{V2}$. and the like of the vertical and horizontal scanning units 202 and 203 are supplied from a driver 205. The driver 205 is controlled by a controller 206.

As described in detail above, according to the photoelectric converting apparatus of the invention, the first signal which is output from the photoelectric conversion unit is stored into the analog memory and the first signal stored can be output from the analog memory at a desired timing in correspondence to the second signal which is output from the photoelectric conversion unit.

On the other hand, by using the analog memory, the photoelectric conversion unit and the analog memory can be also formed onto the same semiconductor substrate. For instance, if the photoelectric conversion unit and the analog memory are constructed by MOS type transistors or the like, they can be formed by the same process. Therefore, the apparatus can be easily manufactured and the apparatus in which the sensor unit and the memory unit have the same characteristics can be obtained. There is a large effect such that a system in which the small size, low costs, and multifunctions are realized can be accomplished.

We claim:

1. A photoelectric converting system comprising:
a photoelectric conversion unit for sequentially outputting photoelectrically converted signals from a plurality of photoelectric conversion elements on an output line:
an analog memory comprising switching means and capacitor means and being arranged to be accessed at random, for receiving the photoelectrically converted signals sequentially outputted on said output line of said photoelectric conversion unit and storing the received signals in said capacitor means; and
control means for outputting the signals stored in said capacitor means in response to sequentially outputting the succeeding photoelectrically converted signals on said output line of said the photoelectric conversion unit.

2. A system according to claim 1, wherein said photoelectric conversion unit and said analog memory are arranged on a common semiconductor substrate.

3. A system according the claim 1, further comprising an output terminal for outputting the first signal from said photoelectric conversion unit, wherein the first signal supplied to said analog memory from said photoelectric conversion unit is supplied to said output terminal.

4. A photoelectric converting system comprising:
a photoelectric conversion unit for outputting photoelectrically converted signals;
an analog memory comprising switching means and capacitor means, said analog memory being arranged to be accessed at random and for storing a first of the photoelectrically converted signals outputted from said photoelectric conversion unit; and
control means for outputting the first signal from said analog memory in correspondence to a second of the photoelectrically converted signals outputted from the photoelectric conversion unit, wherein said control means outputs the first signal at a position of the second signal corresponding to a defective pixel.

5. A photoelectric converting system comprising:
a photoelectric conversion unit for sequentially outputting photoelectrically converted signals from a plurality of photoelectric conversion elements on an output line;
an analog memory comprising switching means and capacitor means and being arranged to be accessed at random, for receiving the photoelectrically converted signals sequentially outputted on said output line of said photoelectric conversion unit and for storing the received signals in said capacitor means;
control means for outputting the signals stored in said capacitor means in response to sequentially outputting the succeeding photoelectrically converted signals on said output line of said the photoelectric conversion unit; and
processing means for arithmetically operating on the signals outputted by said control means and said succeeding photoelectrically converted signals.

6. A photoelectric converting system comprising:
(a) a photoelectric conversion unit comprising a plurality of photoelectric conversion elements, for sequentially outputting image signals photoelectrically converted by said plurality of photoelectric conversion elements on an output line;
(b) a first group of capacitors responsive to switches, for storing image signals sequentially outputted on said output line of said photoelectric conversion unit from every other element among said plurality of photoelectric conversion elements;
(c) a second group of capacitors for storing image signals sequentially outputted on said output line of said photoelectric conversion unit from remaining elements among said plurality of photoelectric conversion elements; and
(d) output means for alternately outputting the image signals stored in said first and second group of capacitors with the image signal sequentially outputted on said output line of said photoelectric conversion unit.

7. A system according to claim 6, wherein said output means comprises a first output line responsive to said first group of capacitors.

8. A system according to claim 7, wherein said output means comprises a second output line responsive to said second group of capacitors.

9. A photoelectric converting system comprising:
(a) a photoelectric conversion unit comprising a plurality of photoelectric conversion elements, for outputting image signals from said plurality of photoelectric conversion elements;
(b) a first group of capacitors for storing image signals outputted from every other element among said photoelectric conversion elements in response to plural switches;

(c) a second group of capacitors for storing image signals outputted from remaining elements among said photoelectric conversion elements;

(d) output means having first and second output lines responsive to said first and second groups of capacitors respectively, for alternately outputting the image signals stored in said first and second groups of capacitors on said first and second output lines with a signal outputted from said photoelectric conversion unit; and (e) a common third output line for outputting the image signals outputted on said first and second output lines, said common third output line being selectively connected to said first and second output lines by selecting means included in said output means.

10. A system according to claim 9, further comprising output terminals, wherein when signals are input from said photoelectric conversion elements to said first and second groups of capacitors in response to switches, aid signals to be inputted are output from the image pickup device through said output terminals.

11. A photoelectric converting system comprising:

(a) photoelectric conversion means for photoelectrically converting light from an object;

(b) a first output line for outputting a signal outputted from said photoelectric conversion means;

(c) temporal storage means for temporally storing the signal outputted from said photoelectric conversion means to said first output line; and (d) read-out control means for synchronizing reading-out of a signal from said temporal storage means with an output timing from said first output line.

12. A photoelectric converting system according to claim 11, wherein said photoelectric conversion means comprises a plurality of photoelectric conversion elements arranged in a matrix.

13. A photoelectric converting system according to claim 11, wherein said temporal storage means comprises a plurality of capacitors.

14. A photoelectric converting system according to claim 11, further comprising a second output line for outputting a signal from said temporal storage means.

15. A photoelectric converting system according to claim 14, further comprising signal processing means responsive to said second output line and said first output line.

16. A photoelectric converting system according to claim 15, wherein said signal processing means comprises subtraction processing means.

* * * * *

UNITED STATES PATENT AND TRADEMARK OFFICE
CERTIFICATE OF CORRECTION

PATENT NO. : 5,280,358
DATED : January 18, 1994
INVENTOR(S) : AKIHIKO YUSHIYA ET AL.     Page 1 of 3

It is certified that error appears in the above-identified patent and that said Letters Patent is hereby corrected as shown below:

TITLE PAGE:

AT [56] REFERENCES CITED

U.S. Patent Documents, Insert
--4,831,451  5/1989  Hynecek ........... 358/213.11
  4,831,454  5/1989  Tanaka et al. ..... 358/213.31--.

Foreign Patent Documents, Insert
--FOREIGN PATENT DOCUMENTS
  54-133823  10/1979  Japan
  57-065074   4/1982  Japan--.

Other Publications, Insert
--OTHER PUBLICATIONS
  L. Yuzuki et al., "A 5732 Element Linear CCD Image Sensor," IEEE Transmiitions on Electron Devices, Vol. 32, No. 8, August 1985, pp. 1541-1545--.

AT [57] ABSTRACT

Line 2, "a" should be deleted.

COLUMN 1

Line 26, "solid state" should read --solid-state--.

UNITED STATES PATENT AND TRADEMARK OFFICE
CERTIFICATE OF CORRECTION

PATENT NO. : 5,280,358
DATED : January 18, 1994
INVENTOR(S) : AKIHIKO YUSHIYA ET AL.

It is certified that error appears in the above-identified patent and that said Letters Patent is hereby corrected as shown below:

COLUMN 2

Line 63, "convertion" should read --conversion--.
Line 66, "3." should read --3;-- and
         "register;" should read --register.--.

COLUMN 3

Line 9, "output" should read --outputted-- and
        "outputted" should read --output--.
Line 22, "pulse" should read --pulses--.
Line 57, "Transistor $T_3$" should read --Transistors $T_3$--.

COLUMN 5

Line 57, "the" should be deleted.
Line 62, "the" should read --to--.

COLUMN 6

Line 29, "the" should be deleted.
Line 52, "group" should read --groups--.

UNITED STATES PATENT AND TRADEMARK OFFICE
CERTIFICATE OF CORRECTION

PATENT NO. : 5,280,358
DATED : January 18, 1994
INVENTOR(S) : AKIHIKO YUSHIYA ET AL.

Page 3 of 3

It is certified that error appears in the above-identified patent and that said Letters Patent is hereby corrected as shown below:

<u>COLUMN 7</u>

Line 22, "aid" should read --said--.

Signed and Sealed this

Eleventh Day of October, 1994

Attest:

BRUCE LEHMAN

*Attesting Officer*  *Commissioner of Patents and Trademarks*